United States Patent
Tickle et al.

(10) Patent No.: US 11,460,136 B2
(45) Date of Patent: Oct. 4, 2022

(54) RAPID-CONNECT COUPLER AND RECEPTACLE HAVING ANTI-ROTATION FEATURE

(71) Applicant: Engineered Controls International, LLC, Elon, NC (US)

(72) Inventors: Tracy N. Tickle, Gibsonville, NC (US); Jeffrey S. Howard, Elon, NC (US); Chad Thomas, Summerfield, NC (US)

(73) Assignee: Engineered Controls International, LLC, Elon, NC (US)

( * ) Notice: Subject to any disclaimer, the term of this patent is extended or adjusted under 35 U.S.C. 154(b) by 115 days.

(21) Appl. No.: 16/838,251

(22) Filed: Apr. 2, 2020

(65) Prior Publication Data
US 2020/0318768 A1    Oct. 8, 2020

Related U.S. Application Data

(60) Provisional application No. 62/829,928, filed on Apr. 5, 2019.

(51) Int. Cl.
| | |
|---|---|
| *F16L 37/23* | (2006.01) |
| *B67D 7/36* | (2010.01) |
| *F16L 55/07* | (2006.01) |

(52) U.S. Cl.
CPC ............. *F16L 37/23* (2013.01); *B67D 7/36* (2013.01); *F16L 55/07* (2013.01)

(58) Field of Classification Search
CPC . F16L 37/18; F16L 37/13; F16L 37/36; F16L 55/07
See application file for complete search history.

(56) References Cited

U.S. PATENT DOCUMENTS

| | | | |
|---|---|---|---|
| 2,461,705 A | 10/1947 | Stranberg | |
| 3,472,482 A | 10/1969 | Gardner | |
| 3,637,050 A | 1/1972 | Hoffmeister | |
| 3,664,634 A | 5/1972 | Guertin et al. | |
| 3,842,614 A | 10/1974 | Karcher et al. | |
| 3,874,411 A | 4/1975 | Vik | |

(Continued)

FOREIGN PATENT DOCUMENTS

KR        101040230        6/2011

OTHER PUBLICATIONS

International Search Report and Written Opinion for PCT/US2020/026388 dated Jun. 9, 2020, 11 pp.

*Primary Examiner* — Kevin L Lee
(74) *Attorney, Agent, or Firm* — Neal, Gerber & Eisenberg LLP

(57) ABSTRACT

A rapid connect coupler for connecting a fluid holding tank to a receptacle in a non-rotatable manner can include a housing, a probe configured to translate in a longitudinal direction within the housing, and a handle assembly configured to cause the probe to translate within the housing. The handle assembly can be movable between a plurality of positions corresponding to decoupled, coupled and venting positions. The coupler can also include a slidable sleeve coupled to an outer surface of the probe and configured to translate with the probe in the longitudinal direction, the sleeve including a collar configured to engage the receptacle in the coupled and uncoupled positions to prevent rotation of the coupler with respect to the receptacle when the two components are engaged to one another.

18 Claims, 16 Drawing Sheets

(56) References Cited

U.S. PATENT DOCUMENTS

| | | | |
|---|---|---|---|
| 3,897,091 A | | 7/1975 | McMath et al. |
| 4,030,524 A | | 6/1977 | McMath et al. |
| 4,374,870 A | | 2/1983 | Sandgren et al. |
| 4,567,924 A | | 2/1986 | Brown |
| 4,676,269 A | | 6/1987 | Sarson |
| 4,962,886 A | | 10/1990 | Stockel |
| 5,265,844 A | | 11/1993 | Westfall |
| 5,404,909 A | * | 4/1995 | Hanson ................. F16L 37/113 137/614.06 |
| 5,405,768 A | | 4/1995 | Xu et al. |
| 5,429,155 A | | 7/1995 | Brzyski et al. |
| 5,560,548 A | | 10/1996 | Mueller et al. |
| 6,082,400 A | | 7/2000 | Tocha |
| 6,142,194 A | | 11/2000 | McClaran |
| 6,155,294 A | | 12/2000 | Cornford et al. |
| 6,202,421 B1 | | 3/2001 | Maguire et al. |
| 6,302,147 B1 | | 10/2001 | Rose et al. |
| 6,945,477 B2 | | 9/2005 | Lambert et al. |
| 9,194,524 B2 | | 11/2015 | Konishi |
| 9,897,239 B2 | | 2/2018 | Konishi |
| 2015/0028587 A1 | | 1/2015 | Marc et al. |
| 2016/0312915 A1 | * | 10/2016 | Konishi et al. ......... F16L 37/24 |

* cited by examiner

RAPID-CONNECT COUPLER AND RECEPTACLE HAVING ANTI-ROTATION FEATURE

CROSS-REFERENCE

This application claims the benefit of U.S. Provisional App. No. 62/829,928, filed on Apr. 5, 2019, which is incorporated by reference in its entirety.

TECHNICAL FIELD

This disclosure generally relates to a rapid-connect coupler configured to deliver cold fluid to a receptacle (e.g., a fuel tank).

BACKGROUND

Cold fluids at cryogenic temperatures (e.g., less than −150 degrees Celsius) pose special handling problems, principally because the temperature of such fluids may quickly cool any valve or coupler through which they flow. When such a coupler is used to transfer a cryogenic fluid, freeze-up problems may occur if the transfer takes place in a moist or high-humidity environment. Water within or immediately outside of the coupler may freeze, thereby impeding subsequent movement of mechanical parts within the coupler. Successive transfers from a single coupler to multiple receptacles may compound the problem.

Additionally, when de-coupling a coupler and receptacle, some amount of fluid venting to ambient is necessary. If the vented fluid is at high pressure, the venting may cause the coupler to forcefully eject from the receptacle.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

An embodiment of the present disclosure provides a rapid-connect coupler for connecting a fluid holding tank to a receptacle in a manner that prevents rotation of the coupler with respect to the receptacle during the entire time of engagement of the two components. Rotation of the coupler when it is engaged to the receptacle may cause damage to the internal valve components of either side. The coupler in accordance with the present disclosure comprises a housing, a probe configured to translate in a longitudinal direction within the housing, and a handle assembly configured to cause the probe to translate within the housing. The handle assembly can be movable between a first position corresponding to a decoupled position where the fluid holding tank is disconnected from the receptacle, a second position corresponding to a coupled position where the fluid holding tank is connected to the receptacle, a third position corresponding to a venting position where the fluid holding tank is connected to the receptacle and venting of fluid is enabled. The coupler further comprises a slidable sleeve coupled to an outer surface of the probe and configured to translate with the probe in the longitudinal direction, the sleeve including a collar configured to engage the receptacle in the second and third positions, thereby preventing rotation of the coupler with respect to the receptacle.

A rapid-connect coupler for use with the present disclosure is taught in commonly owned U.S. Pat. No. 9,897,239, the terms of which are incorporated herein by reference. Such a rapid connect coupler may include, for example, a vent stop assembly that includes a release lever, release spring, latch pawl, latch spring, catch, and reset cam. The latch pawl may be configured to engage with a probe flange of a probe to implement a hard stop of the probe translating within the rapid-connect coupler. The catch may be configured to hold the latch pawl in an "up" position.

Such a rapid connect coupler may also include, for example, a housing body, a probe, a handle assembly, and a stop vent assembly is disclosed. The probe may be configured to translate within the housing body. The handle assembly may be coupled to the housing body and the probe, and the handle assembly may be configured to cause the probe to translate within the housing body. The stop vent assembly may be configured to enable the rapid-connect coupler to transition from a decoupled configuration to a coupled configuration without a hard stop, and configured to enable the rapid-connect coupler to transition to a venting configuration between transitioning from the decoupled configuration to the coupled configuration. The rapid-connect coupler may further include a vent stop apparatus configured to allow a coupling head of the rapid-connect coupler to transition from a decoupled configuration to a coupled configuration without obstruction. The vent stop apparatus may further be configured to provide a hard-stop at a venting position as the coupling head transitions from the coupled configuration to the decoupled configuration. The reader is referred to U.S. Pat. No. 9,897,239 for further benefits of such a coupler.

For a better understanding of the disclosure, reference may be made to embodiments shown in the drawings. The components in the drawings are not necessarily to scale, and related elements may be omitted so as to emphasize and clearly illustrate the novel features described herein. In addition, system components can be variously arranged, as known in the art. In the figures, like referenced numerals may refer to like parts throughout the different figures unless otherwise specified. It should be understood that for clarity in certain cross-sectional views, certain elements are not shown in cross-section, as doing so would not assist in the understanding of the invention.

DETAILED DESCRIPTION

Figure 1:
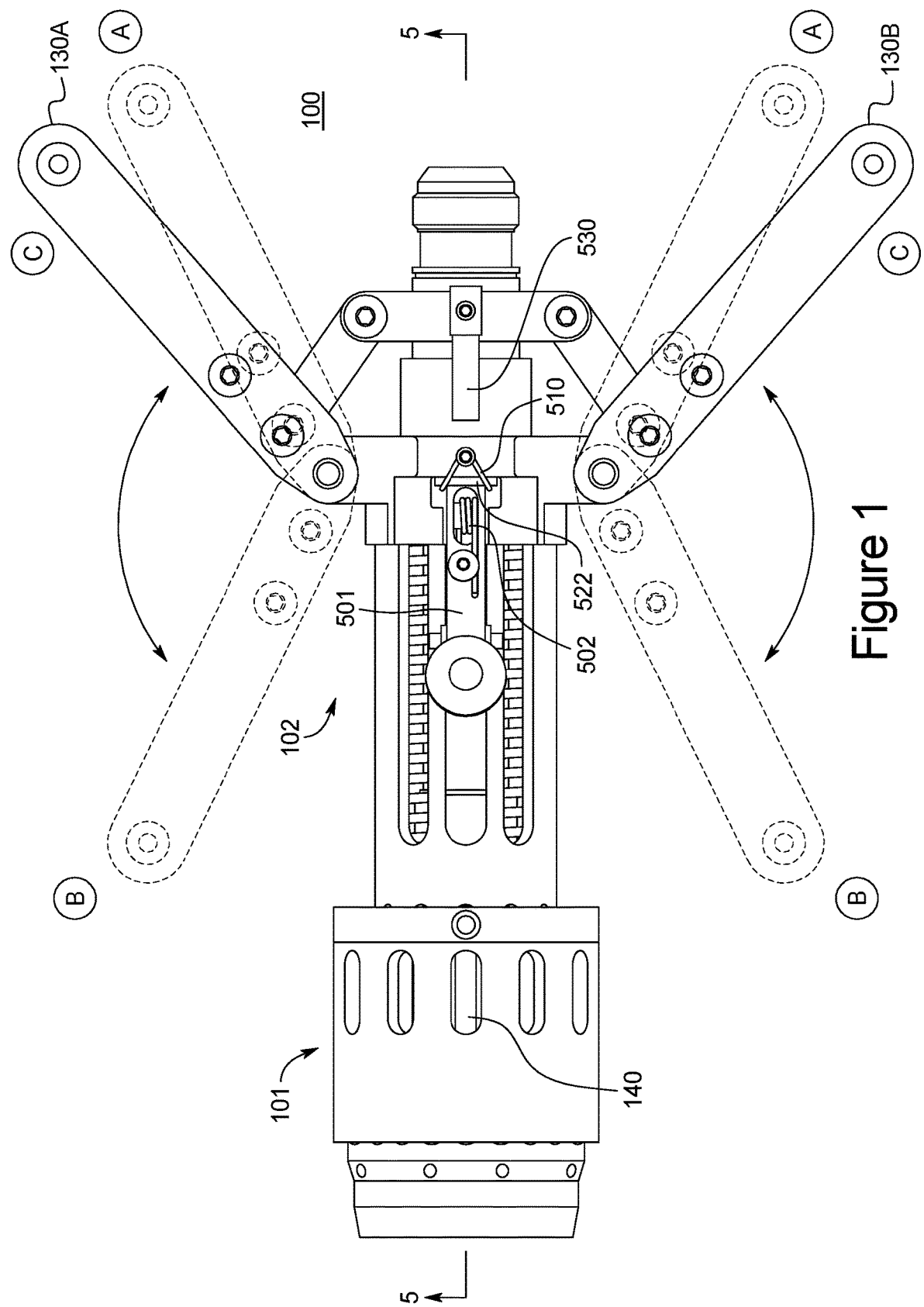
FIG. 1 is a top view of a prior art rapid-connect coupler, depicting three handle positions.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein. As stated above, it should be understood that for clarity in certain cross-sectional views, certain elements are not shown in cross-section, as doing so would not assist in the understanding of the invention.

Figure 2:
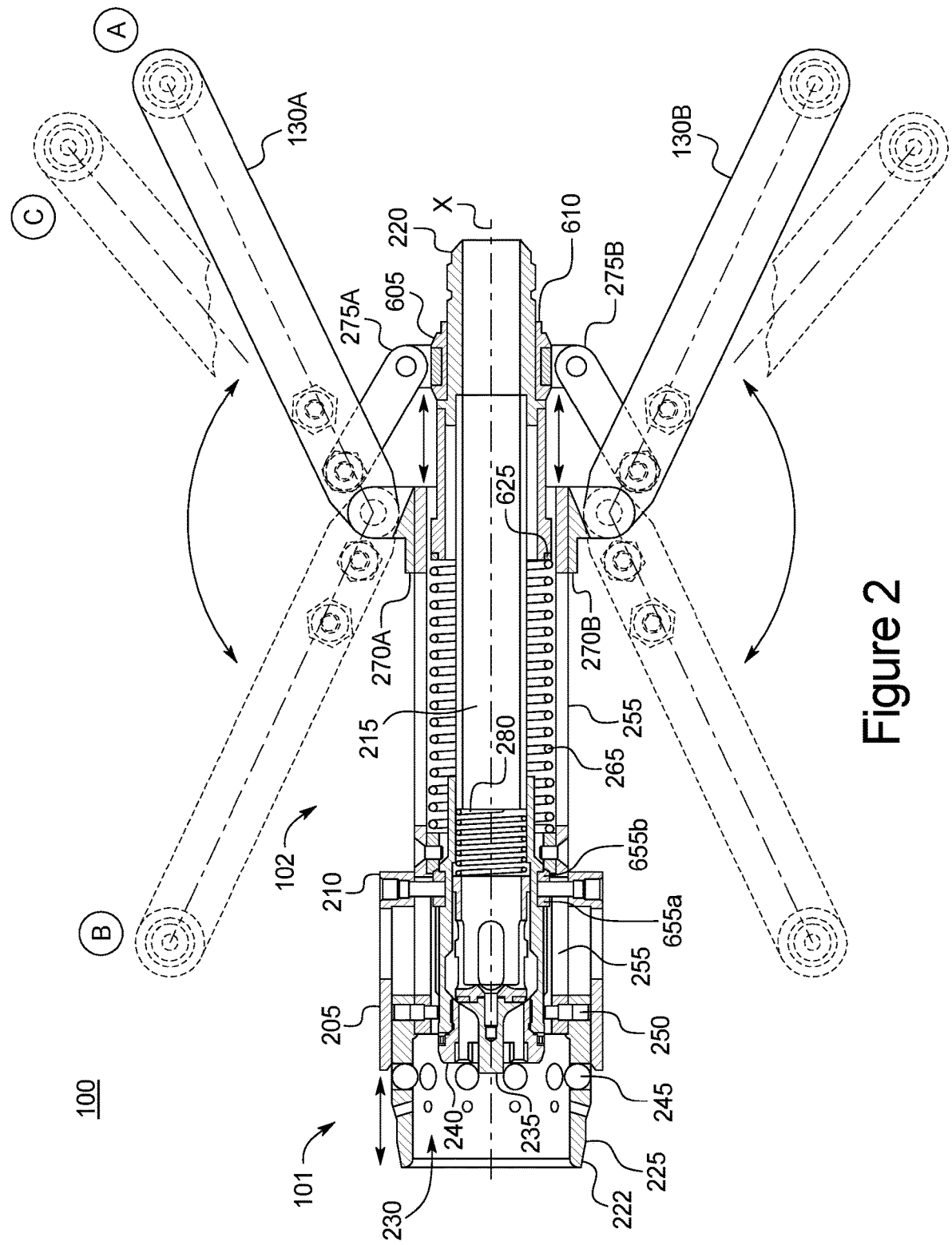
FIG. 2 is a top cross-sectional view of the rapid-connect coupler of FIG. 1.

FIG. 1 is a top view of a prior art rapid-connect coupler 100 having a coupler head section 101 and a coupler body section 102. The components of rapid-connect coupler 100 may be considered to be part of a first structure and/or a second structure, wherein component(s) of the first structure and the second structure are configured to move relative to each other as further described herein. The first structure may include a sleeve 205, one or more drive pins 210, and a probe assembly 215, which includes a coupling end 220. The one or more drive pins 210 extend through a respective drive slot 140 defined in a ball cage 225. The drive pins 210 link the sleeve 205 to the probe assembly 215. Drive pins 210 are fixed to the probe assembly 215 via opposing retaining rings 655a and 655b. As shown in FIG. 2, the retaining rings 655a and 655b compress against an outer circumference of the probe assembly 215. The second structure includes the ball cage 225 defining a coupling orifice 230 and including one or more balls 245. The balls 245 are retaining objects that are configured to bind the rapid-connect coupler 100 to a receptacle (e.g., a fueling receptacle 400).

A first poppet assembly 235 resides within coupling orifice 230 and may be biased by a poppet assembly spring 280. The first poppet assembly 235 further comprises a retainer 240 and a seal assembly 260. The second structure may further include one or more guide pins 250, and a housing barrel 255. The one or more guide pins 250 center the probe assembly 215 along the longitudinal central axis of housing barrel 255. Additionally, the second structure, or portions thereof, may be removable and configured for easy and swift removal and replacement, which may be required due to damage or maintenance needs. Certain portions of the design described herein are similar to that disclosed in commonly owned U.S. Pat. No. 9,194,524, the contents of which are incorporated herein by reference in their entirety.

Rapid-connect coupler 100 further includes a first handle 130A and a second handle 130B of a handle assembly. FIG. 1 illustrates the positions of the first handle 130A and the second handle 130B in three different configurations of rapid-connect coupler 100: (1) configuration A corresponds to a decoupled state of rapid-connect coupler 100; (2) configuration B corresponds to a coupled state of rapid-connect coupler 100; and (3) configuration C corresponds to a semi-coupled state of rapid-connect coupler 100 that enables venting. As discussed below, a vent stop assembly is configured to provide a hard stop in configuration C.

FIG. 2 is a top cross-sectional view of the rapid-connect coupler 100 in configuration A when handles 130A and 130B are pulled all or substantially all the way back away from coupler head section 101. Handles 130A and 130B are rotatably coupled to housing barrel 255 via a first barrel flange 270A and a second barrel flange 270B. Additionally, a first link assembly 275A and a second link assembly 275B of the handle assembly are rotatably attached to first handle 130A and second handle 130B, respectively. The first link assembly 275A and second link assembly 275B are also rotatably attached to probe assembly 215. More specifically, one end of each link assembly 275 may be fixed to a handle 130. The other end of each link assembly 275 may be fixed to the probe assembly 215 via a base 605. Base 605 is directly attached to the probe assembly 215, and base 605 may be fixed to the probe assembly 215 via a compressive force delivered by a ring 610.

Figure 3:
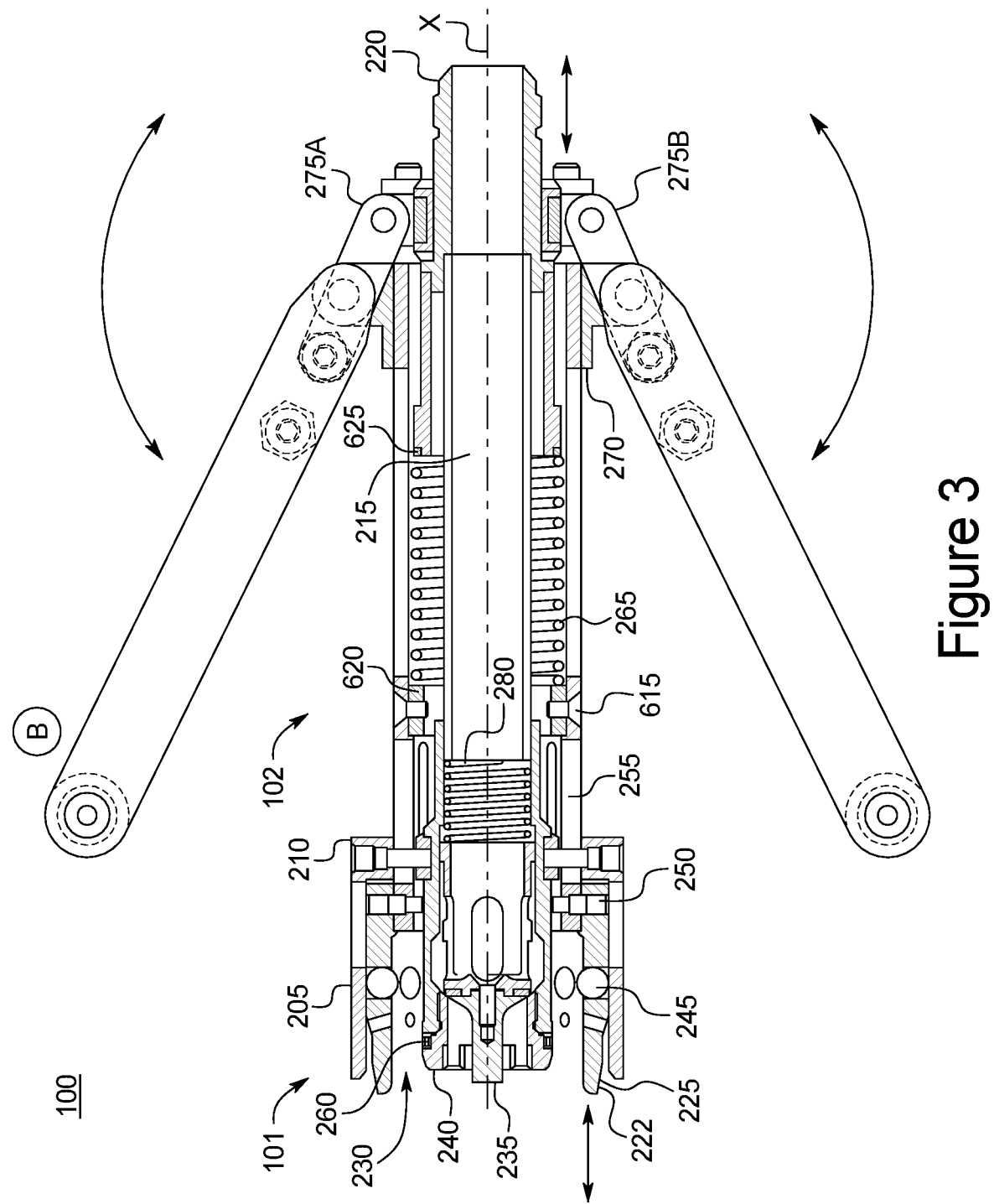
FIG. 3 is a top cross-sectional view of the rapid-connect coupler of FIG. 1 with the handles in a second position.

As handles 130A and 130B rotate, enabling the rapid-connect coupler 100 to transition between the A and B configurations, the first structure longitudinally translates relative to the second structure along the central axis X. More specifically, rotation of handles 130A and 130B from their positions in configuration A to their positions in configuration B delivers longitudinal force to probe assembly 215, via link assemblies 275. This longitudinal force opposes a counter-biasing force of probe spring 265, enabling longitudinal translation of probe assembly 215 in housing barrel 255. Sleeve 205 longitudinally translates with probe assembly 215 by virtue of drive pins 210. In FIG. 2, sleeve 205 is longitudinally retracted with respect to ball cage 225. In FIG. 3, sleeve 205 is longitudinally extended with respect to ball cage 225. One end of probe spring 265 may rest on spring seat 625, which is fixed to flange 290. Flange 290 is described in detail below. The other end of probe spring 265 may rest against spring stop 620, which is fixed to housing barrel 255 via pins, screws, or bolts 615.

Figure 4:
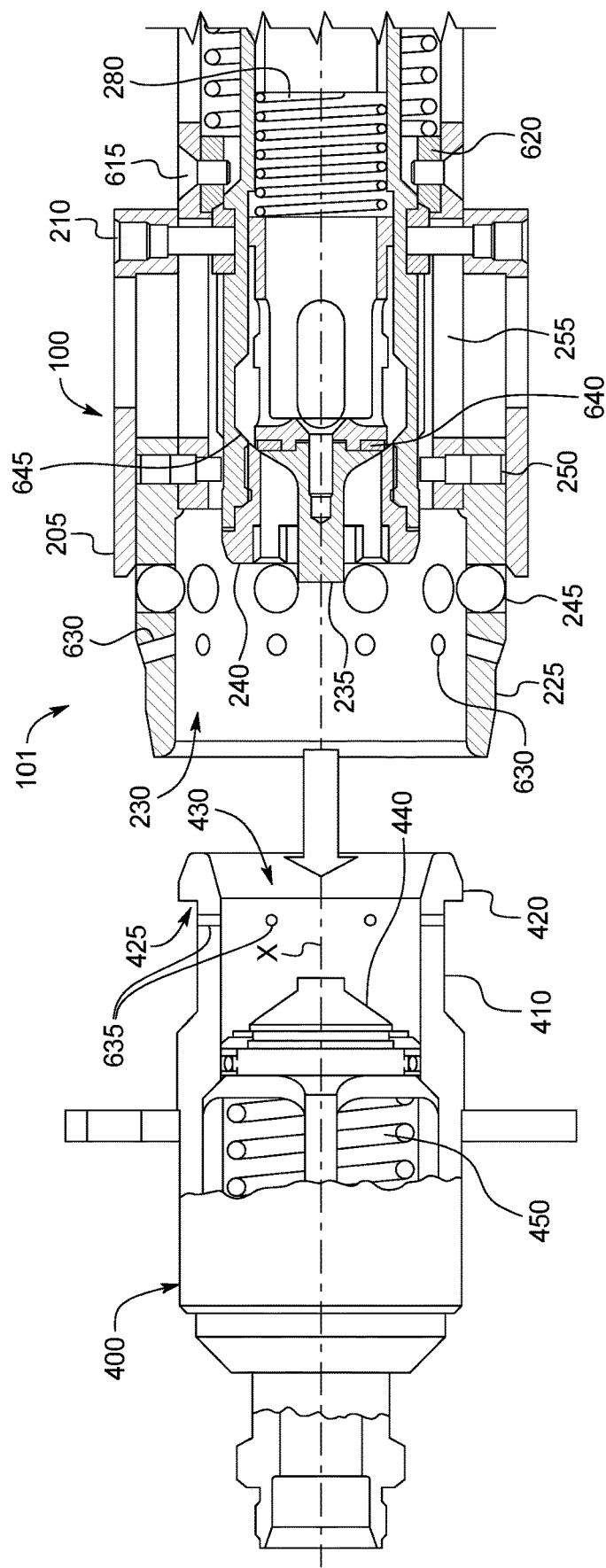
FIG. 4 is a side cross-sectional view of the rapid-connect coupler of FIG. 1 and an exemplary receptacle.

FIG. 4 is a side cross-sectional view of a rapid-connect coupler 100 and a fueling receptacle 400 aligned along a central axis X. The fueling receptacle 400 comprises a coupling body 410, which includes a lip 420, and a recess 425 behind lip 420. The coupling body 410 defines a second poppet orifice 430. A second poppet assembly 440 is disposed within second poppet orifice 430 and is biased closed by spring 450.

Rapid-connect coupler 100 is configured to couple with fueling receptacle 400. Referring to FIG. 4, coupling body 410 slides into first coupling orifice 230, enabling retainer 240 to slide into second poppet orifice 430. As retainer 240 slides into second poppet orifice 430, spring seal 260 seals against an inner diameter of coupling body 410. Additionally, first poppet assembly 235 bears against second poppet assembly 440. Force from second poppet assembly 440 opposes counter-biasing force of spring 280, enabling first poppet assembly 235 to longitudinally translate until reaching a hard stop 650 (labeled in FIG. 9). When first poppet assembly 235 longitudinally translates, sealing surface 640 of poppet assembly 235 retreats from valve seat 645 of retainer 240. Fluid may now flow from coupling end 220, through probe assembly 215, and into second poppet orifice 430.

Once first poppet assembly 235 bears against hard stop 650 (labeled in FIG. 9), first poppet assembly 235 transfers enhanced longitudinal force to second poppet assembly 440. The enhanced force opposes a counter-biasing force of spring 450 and enables second poppet assembly 440 to longitudinally retreat from a valve seat (not shown). It should be appreciated that second poppet assembly 440 may operate according to the same general principles as first poppet assembly 235.

In configuration A, when coupling body 410 is received within first coupling orifice 230, the lip 420 pushes the one or more balls 245 radially outward in their slots 910 (see FIG. 9) until lip 420 longitudinally translates past the balls 245. A user then engages configuration B, as shown in FIG. 3. In configuration B, sleeve 205 covers the slots 910, which locks balls 245 into a recess 425 behind lip 420. Coupling body 410 is now locked within first coupling orifice 230.

In configuration B, the second poppet assembly 440 and the first poppet assembly 235 may be operable to enable fluid flow from the rapid-connect coupler 100 into coupling body 410. As discussed above, seal 260 seals against the interior circumference of the coupling body 410 within the second poppet orifice 430. Seal assembly 260 is a two piece seal including an energizing spring.

When the rapid-connect coupler 100 is released from fueling receptacle 400, the contents thereof such as a fluid (e.g. liquid natural gas), may vent from rapid-connect coupler 100 as the connection with fueling receptacle 400 is broken. The fluid vents through slots 635 in receptacle 400 and slots 630 in coupler 100. Venting occurs when seal 260 longitudinally retreats past slots 635, thus exposing second poppet orifice 430 to ambient atmosphere.

It is desirable to allow rapid-connect coupler 100 to vent before rapid-connect coupler 100 is fully disengaged from fueling receptacle 400 because venting can generate a substantial propulsive force on one or more of the coupler 100 and the receptacle 400. Rapid-connect coupler 100 applies a positive stop in configuration C, which enables the rapid-connect coupler 100 to vent before it is fully disengaged from fueling receptacle 400.

Figure 7:
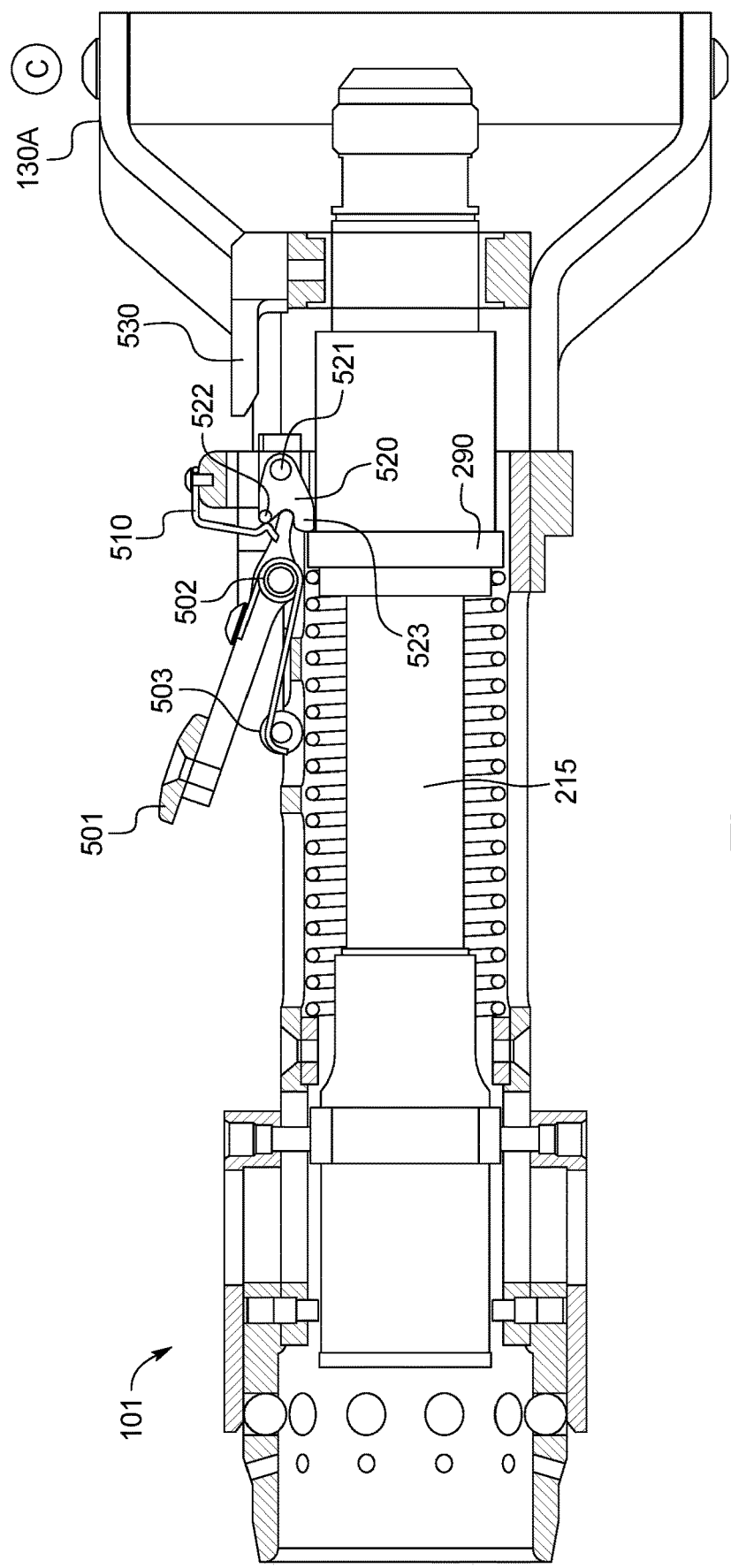
FIG. 7 is a cross-sectional side view similar to FIG. 5 with the handles in a third position and with a stop in a first position.

FIG. 7 shows configuration C of rapid-connect coupler 100. In general terms, probe assembly 215 hard stops against edge 523. In this position, sleeve 205 covers the balls 245 (and more specifically, the ball slots 910). As a result, sleeve 205 presses balls 245 into groove 425. Receptacle 400 cannot detach from coupler 100 in this position. The poppet assemblies no longer touch and therefore close. Further, seal 260 has longitudinally retreated behind venting slots 635, enabling venting of fluid from orifice 430 to ambient via venting slots 635 and 630.

After venting has been completed, a user may actuate the vent stop assembly to fully retract probe assembly 215 (and therefore sleeve 205). Now lip 420 exerts a radial force on balls 245, causing balls 245 to radially translate and disengage from groove 425. Once this has occurred, the user may retract coupler 100 from receptacle 400. Balls 245 are spherical, made of a metal, and sized for an interference fit within slots 910. The spherical shape of balls 245 advantageously release from grooves 425 more efficiently than other shapes. Also, spherical balls 245 tend to release ice efficiently.

Figure 5:
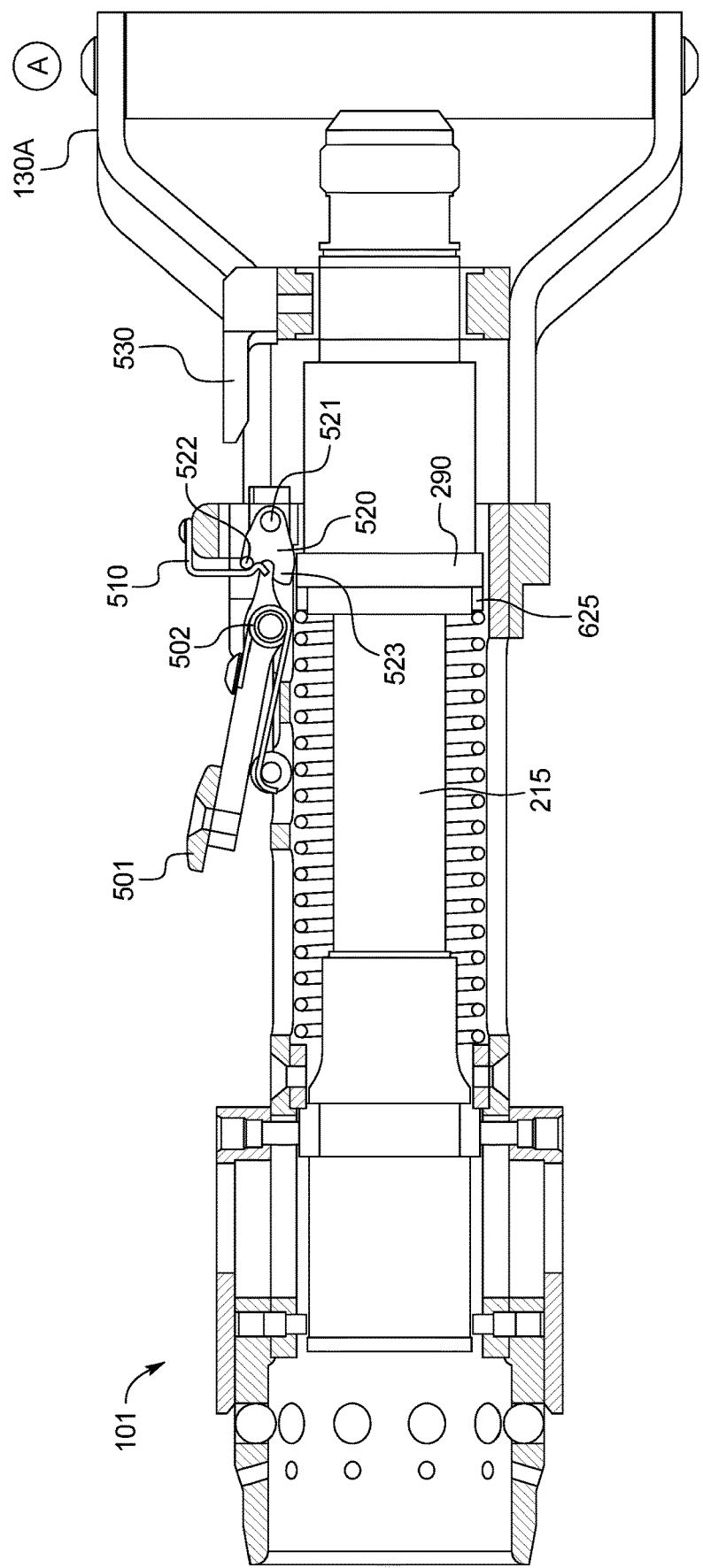
FIG. 5 is a cross-sectional side view of the rapid-connect coupler of FIG. 1 along 5-5 of FIG. 1 with the handles in a first position.

As discussed above, rapid-connect coupler 100 is configured to generate a positive stop at configuration C via a vent stop assembly. FIG. 5 depicts the vent stop assembly and also shows the rapid-connect coupler 100 in the decoupled state corresponding to configuration A. The vent stop assembly (also referred to as a stop assembly) includes a release lever 501, a lever spring 502, a lever spring connector 503, a latch pawl 520, a catch 510, a latch pin 522, and reset cam 530. Release lever 501, lever spring connector 503, catch 510, and latch pawl 520, may be attached, either directly or indirectly, to housing barrel 255, while reset cam 530 may be attached to probe assembly 215. One end of the lever spring 502 directly attaches to release lever 501 and another end of lever spring 502 directly attaches to lever spring connector 503, which is fixed to housing barrel 255.

Latch pawl 520 is rotatably mounted on rod 521 and is rotatable between a "down" position where its front edge 523 engages with probe flange 290 to provide the hard stop that arrests translation of probe assembly 215 at configuration C, as shown in FIG. 7, and an "up" position where latch pawl 520 is clear of probe flange 290, as shown in FIG. 5. As described below, reset cam 530 acts to reset latch pawl 520 from its "up" position to the "down" position when handles 130A, 130B are moved from configuration A to configuration B. As depicted, latch pawl 520 is biased down towards probe assembly 215 due to the downward biasing force of release lever 501 and/or lever spring 502.

When rapid-connect coupler 100 is in configuration A, as illustrated in FIG. 5, latch pawl 520 is retained in the "up" position by frictional forces between latch pawl 520 and catch 510. Such frictional forces provide an upward holding force that may be greater than, or equal to, the downward biasing forces being exerted on the latch pawl 520 by one or more of the rod 521 and release lever 501. Latch pawl 520 does not engage with probe flange 290 while latch pawl 520 is being held in this "up" position by catch 510.

As illustrated in FIGS. 1 and 5, latch pin 522 is fixed to latch pawl 520 and may be integrally formed with latch pawl 520. Latch pin 522 transversely extends beyond the outer sides of latch pawl 520. In FIG. 5, for example, latch pin 522 extends into and out of the page. This enables latch pin 522 to engage both sides of catch 510 (FIG. 1 shows the two sides of catch 510) without contacting latch pawl 520 directly. This advantageously reduces wear on latch pawl 520 and clears room for lever 501 to engage latch pawl.

Alternatively, latch pawl 520 may be configured to include a top opening (not illustrated) having latch pin 522 extending across it such that latch pawl 520 may be configured to engage latch pin 522 through the top opening without contacting latch pawl 520 directly.

By configuring catch 510 to hold latch pawl 520 in the "up" position, the front edge 523 of latch pawl 520 does not contact probe flange 290 as probe assembly 215 translates forward towards coupler head section 101 as rapid-connect coupler 100 transitions from configuration A (i.e., the decoupled state) to configuration B (i.e., coupled state). The angled shape of latch pawl 520 also aids in preventing a hard stop of probe assembly 215 during such movement.

Figure 6:
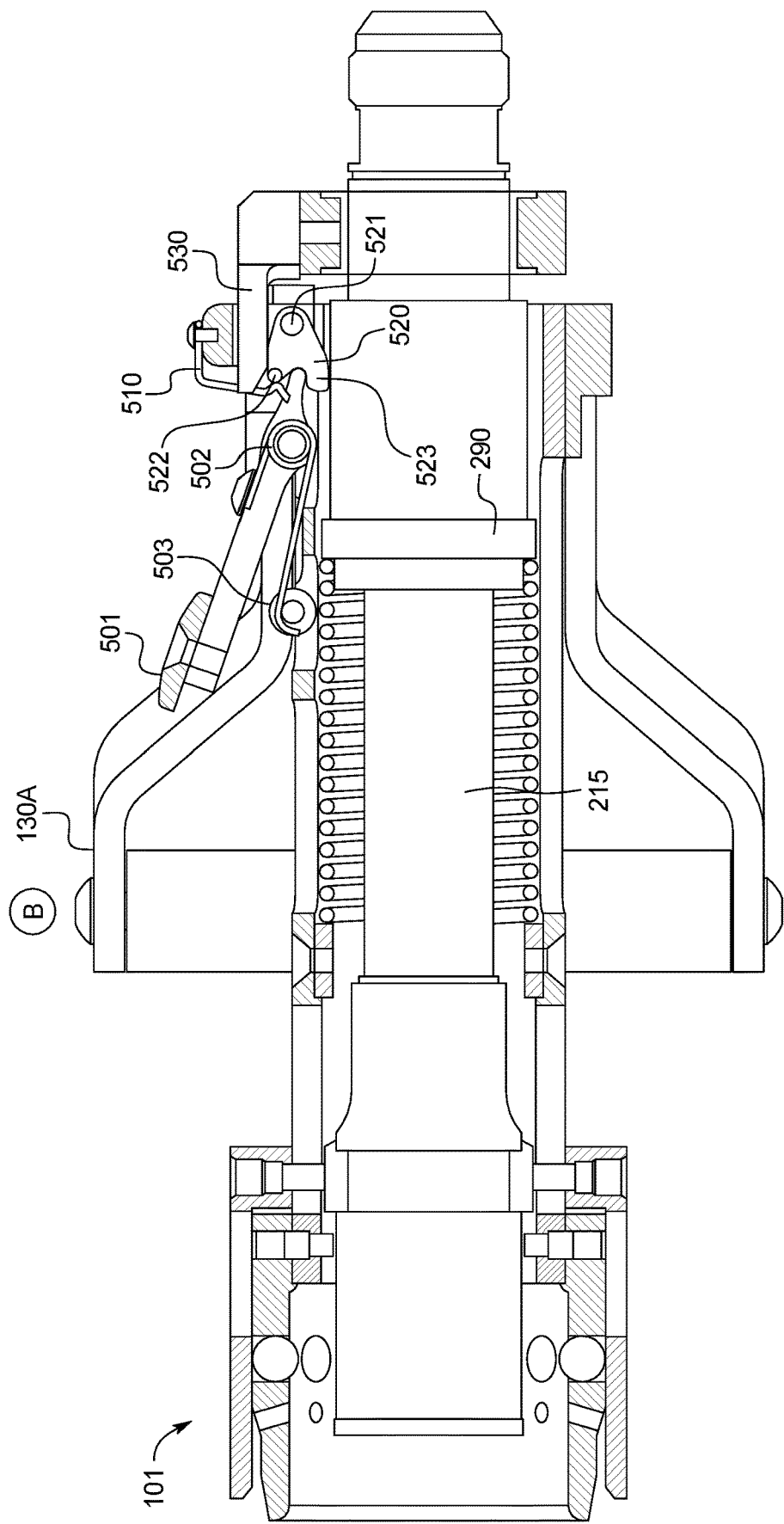
FIG. 6 is a cross-sectional side view similar to FIG. 5 with the handles in the second position.

Reset cam 530 translates with probe assembly 215 and begins engagement with latch pawl 520 as rapid-connect coupler 100 transitions to configuration B, as shown in FIG. 6. In configuration B, rapid-connect coupler 100 is coupled to, for example, fueling receptacle 400 as illustrated in FIG.

4. As discussed above, coupler 100 is configured to flow fluid to receptacle 400 in configuration B.

As rapid-connect coupler 100 transitions from configuration A to configuration B, handles 130A and 130B rotate toward coupler head section 101. The forward rotation of handles 130A and 130B rotates links 275, thus longitudinally translating probe assembly 215 from within housing barrel 255 into a coupled engagement with fueling receptacle 400. The translation of probe assembly 215 causes reset cam 530 to translate forward to engage latch pawl 520. By engaging latch pawl 520, reset cam 530 releases latch pawl 520 from its up position and rotates latch pawl 520 to its "down" position (shown in FIG. 6). After being reset by reset cam 530, latch pawl 520 is biased to its down position by one or more of the release lever 501 and/or lever spring 502.

When handles 130A and 130B rotate away from coupler head section 101, rapid-connect coupler 100 transitions from configuration B to configuration C, which is shown in FIG. 7. The transition of handles 130A and 130B further causes the translation of probe assembly 215 back into second housing barrel 255 until probe flange 290 contacts latch pawl 520. Following the release of the latch pawl 520 from the "up" position to the "down" position in configuration B, latch pawl 520 is now in place to contact probe flange 290, as shown in FIG. 7. As described above, latch pawl 520 provides a hard stop that prevents probe assembly 215 from further retreating within housing barrel 255. As described above, this keeps coupler 100 and receptacle 400 locked together by virtue of balls 245 and sleeve 205.

Figure 8:
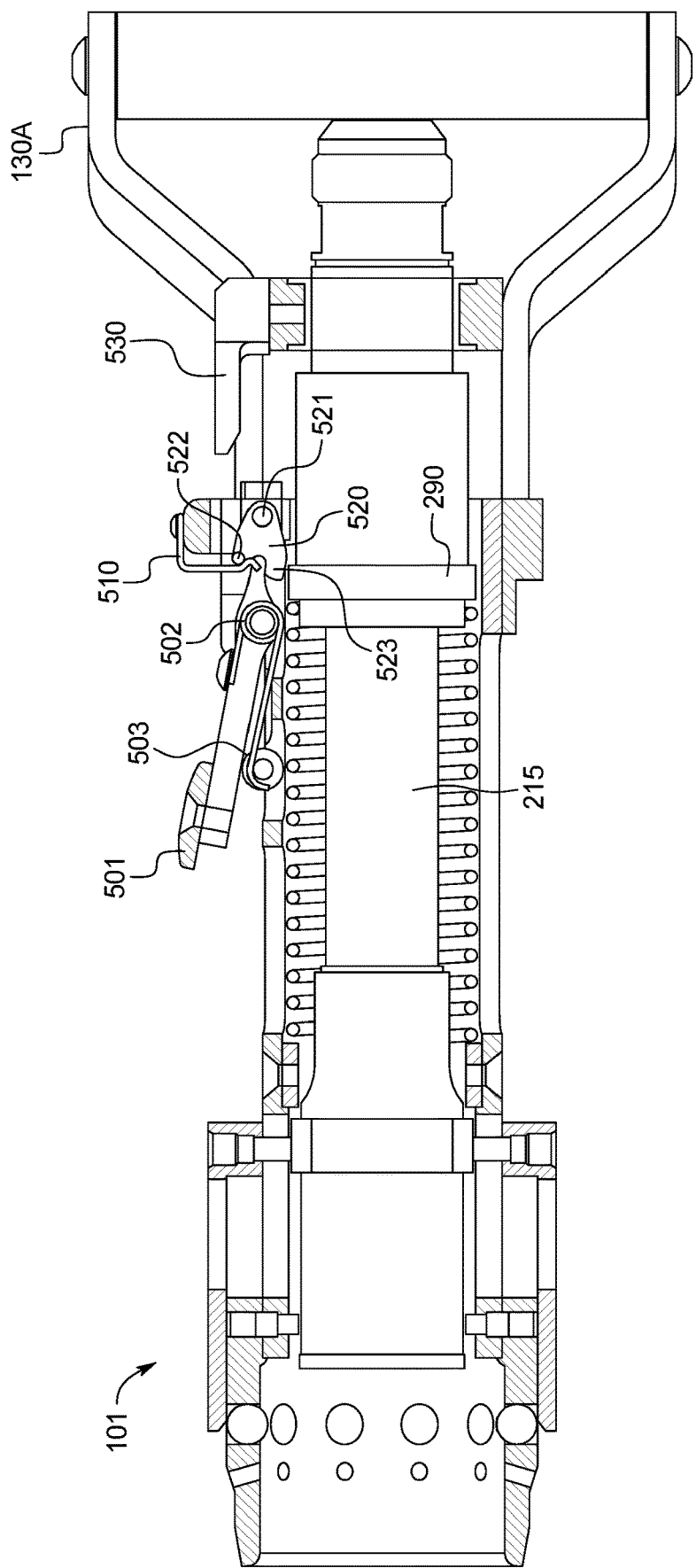
FIG. 8 is a cross-sectional side view similar to FIG. 7 with the stop in a second position.

Latch pawl 520 may be released from its hard stop engagement with probe flange 290 via release lever 501. The user may release latch pawl 520 after proper venting has been accomplished. FIG. 8 illustrates rapid-connect coupler 100 following the release of the hard stop provided by latch pawl 520 engaging with probe flange 290. Handles 130A and 130B may continue to occupy their configuration C positions. A downward force on the opposing end of release lever 501 releases latch pawl 520 from the hard stop. More specifically, the downward force on the opposing end of release lever 501 causes the other end of release lever 501 to lift or rotate latch pawl 520 toward the catch 510. As described above, the spring 502 may bias release lever 501 to the position shown in FIG. 7. Release lever 501 pivots about the attachment point between the spring 502 and the release lever 501.

If a part in the coupler 100 becomes stuck due to freezing, it may be necessary to longitudinally agitate (i.e., push and pull) rapid-connect coupler 100 to fully de-couple from fueling receptacle 400. More specifically, a user may need to apply force to handles 130 until the ice breaks and the probe assembly 215 is free to move. In these cases, it may be advantageous or necessary to eliminate the hard stop provided by pawl 520. Catch 510 is configured to provide sufficient upward holding force (e.g., frictional force) on latch pawl 520 in order to keep latch pawl 520 in the "up" position while the rapid-connect coupler is being agitated. By using catch 510 to help maintain the latch pawl 520 in the "up" position, the risk of latch pawl 520 falling down and re-engaging with probe flange 290 to provide the hard stop as rapid-connect coupler 100 is being agitated back and forth may be reduced, or even eliminated.

Typically a user will understand the rapid-connect coupler 100 needs to be longitudinally agitated following the completion of a venting process when coupler 100 is in configuration C of FIG. 7. The user may now apply release lever 501 to release the latch pawl 520 from the hard stop position into the "up" position shown in FIG. 8. More specifically, after realizing a need for the rapid-connect coupler 100 to be longitudinally agitated, the user may longitudinally agitate the rapid-connect coupler 100 while catch 510 holds latch pawl 520 in the "up" position. During longitudinally agitation of rapid-connect coupler 100, catch 510 is configured to keep latch pawl 520 in the "up" position.

Figure 9:
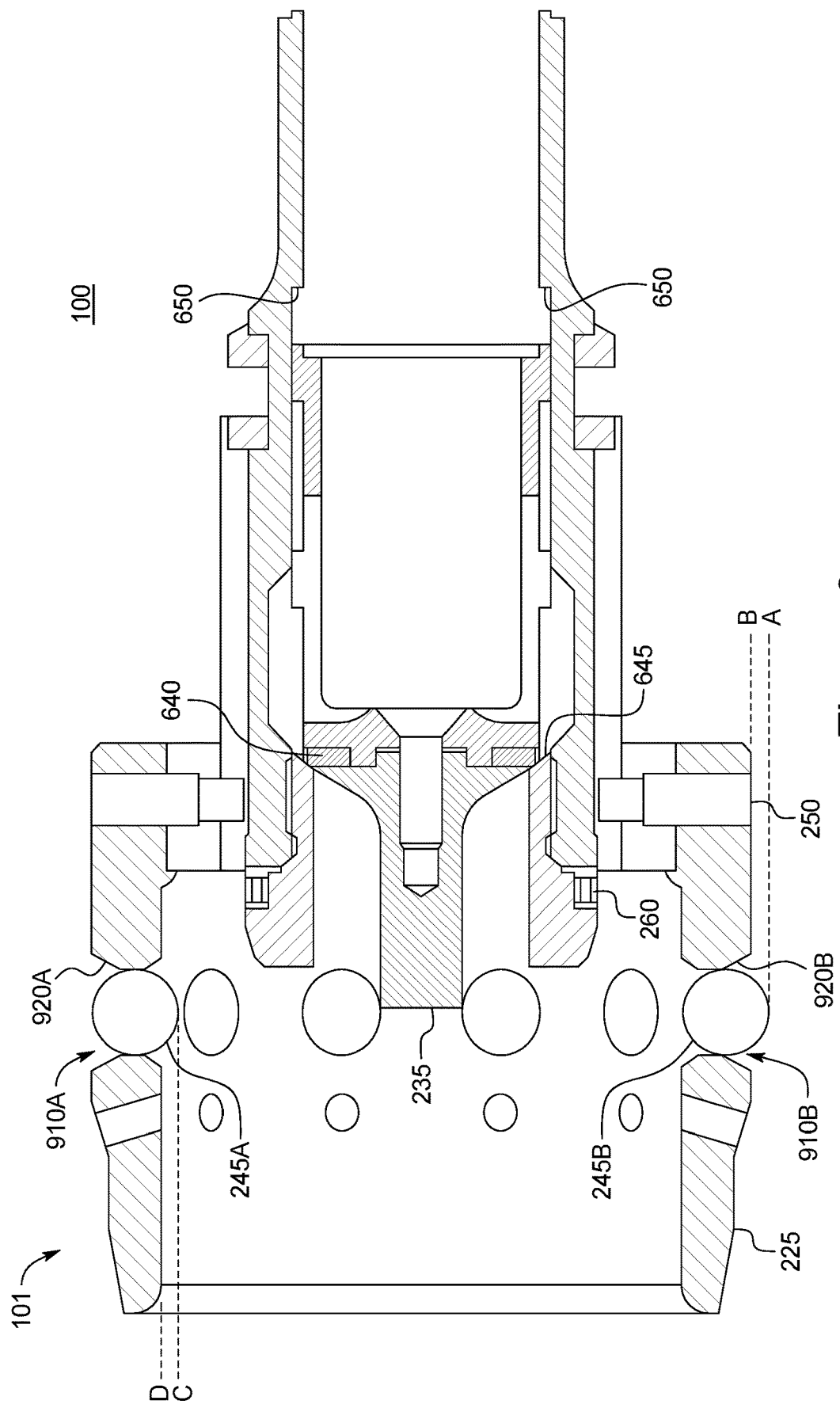
FIG. 9 is a cross-sectional view of a coupling head of the rapid-connect coupler of FIG. 1 showing details of retaining balls.

Additionally, as depicted in FIG. 9, it may be desirable for the balls 245 to be disposed within tapered slot 910A and tapered slot 910B, which are defined by tapered wall 920A and tapered wall 920B, respectively. For example, tapered slots 910A, 910B may be concave toward the external and internal portions of the ball cage 225. Tapered slots 910A, 910B may be desirable because the tapered slots 910A, 910B tend to release ice more efficiently, which may form within the tapered slots 910A, 910B when cold temperatures are present (e.g., when using a cooled gas such as liquid natural gas or in cold environmental conditions). The tapered walls 920A, 920B may be of various configurations and types of tapers, including linear tapers or curved tapers, and the entirety of the tapered slots 910A, 910B may or may not include a taper. Balls 245 may be made from a metal and sized for a dimensional interference fit inside the tapered slots 910.

The balls 245 are further sized to protrude from the slots 910 in the radial direction. More specifically, the sleeve 205 causes the balls 245 to radially protrude from an inner circumference of ball cage 225. When sleeve 205 does not cover slots 910, lip 420 causes the balls to radially protrude from an outer circumference of ball cage 225. In FIG. 9, ball 245B outwardly radially protrudes from outer circumference B of ball cage 225 to distance A. The outer most point of ball 245B now radially extends a distance A-B from ball cage 225. In FIG. 9, ball 245A inwardly radially protrudes from inner circumference D of ball cage 225 to a distance C. The inner most point of ball 245A now radially extends a distance C-D from ball cage 225. Gravity may cause balls 245 to occupy the positions shown in FIG. 9. In other instances, the dimensional interference fit is too tight for gravity to radially translate balls 245.

Referring now to FIGS. 10-16, shown is a rapid-connect coupler 700 and a fueling receptacle 800 further comprising anti-rotation features to prevent coupler 700 from unintentionally rotating relative to receptacle 800, for example, during fluid delivery. Excess rotation in this manner can lead to premature deterioration of the seal (e.g., seal 260) formed between the coupler 700 and the receptacle 800, especially in cryogenic applications where the seal may be particularly delicate. To solve these and other problems, coupler 700 includes an anti-rotation sleeve 705 configured for attachment to an anti-rotation adapter 860 of receptacle 800. Coupling sleeve 705 to adapter 860 can prevent rotation or spinning of the coupler 700 about a central axis (e.g., axis X shown in FIG. 16), thus increasing the life of the seal between the coupler 700 and the receptacle 800.

Figure 10:
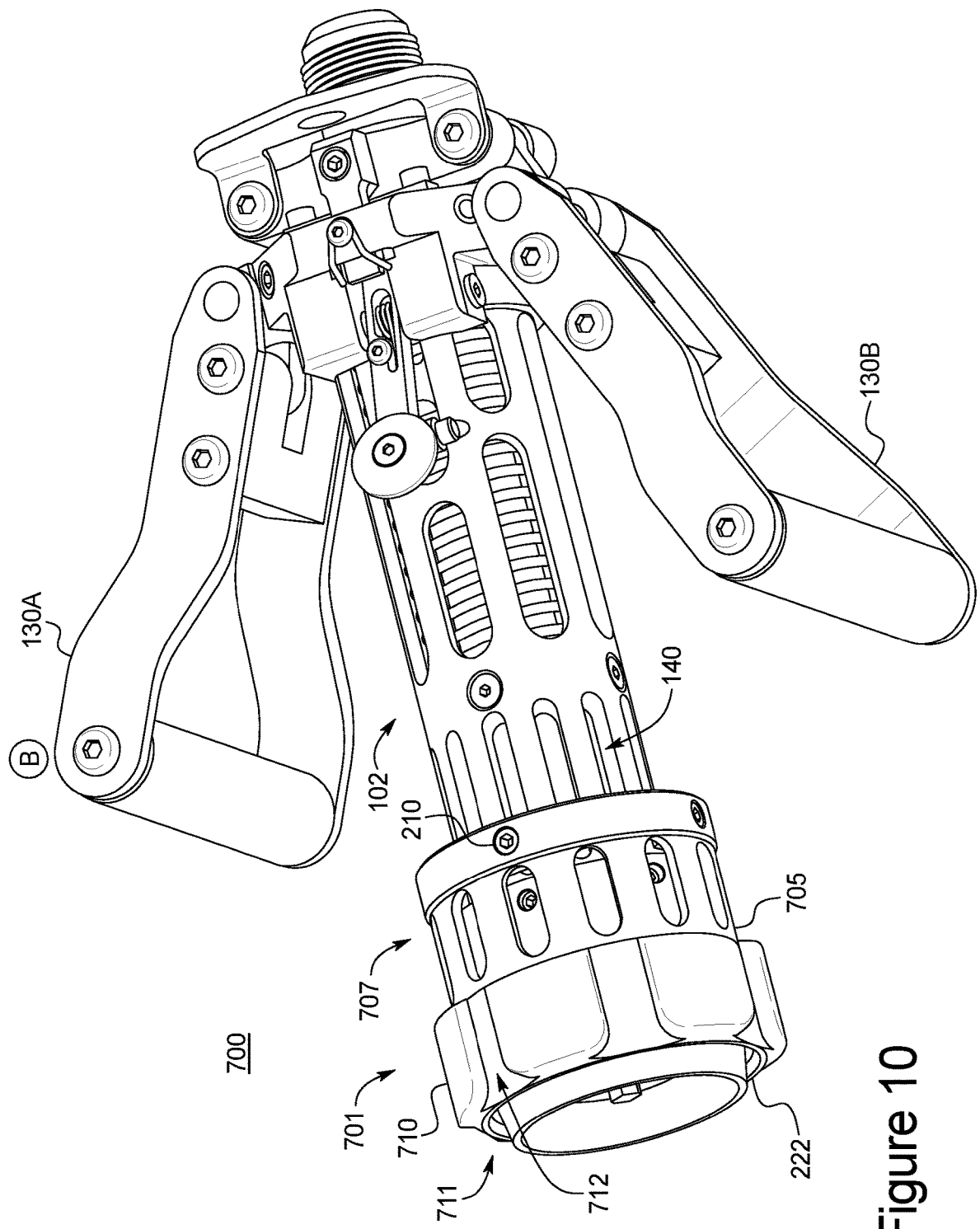
FIG. 10 is a perspective view of an exemplary rapid-connect coupler with an anti-rotation sleeve and with handles in a coupled position.

Coupler 700 may be substantially similar to coupler 100 shown in FIGS. 1-9 and described herein, in structure and operation, except for coupler head section 701 comprising the anti-rotation sleeve 705. For example, coupler 700 includes coupler body section 102, same as coupler 100. Also, coupler head section 701 is substantially similar to coupler head section 101, except that sleeve 205 is replaced with sleeve 705. As shown in FIG. 10, anti-rotation sleeve 705 includes a back portion 707 adjacent to coupler body section 102 and a collar portion 710 adjacent to a coupling end 711 of the sleeve 705.

Figure 11:
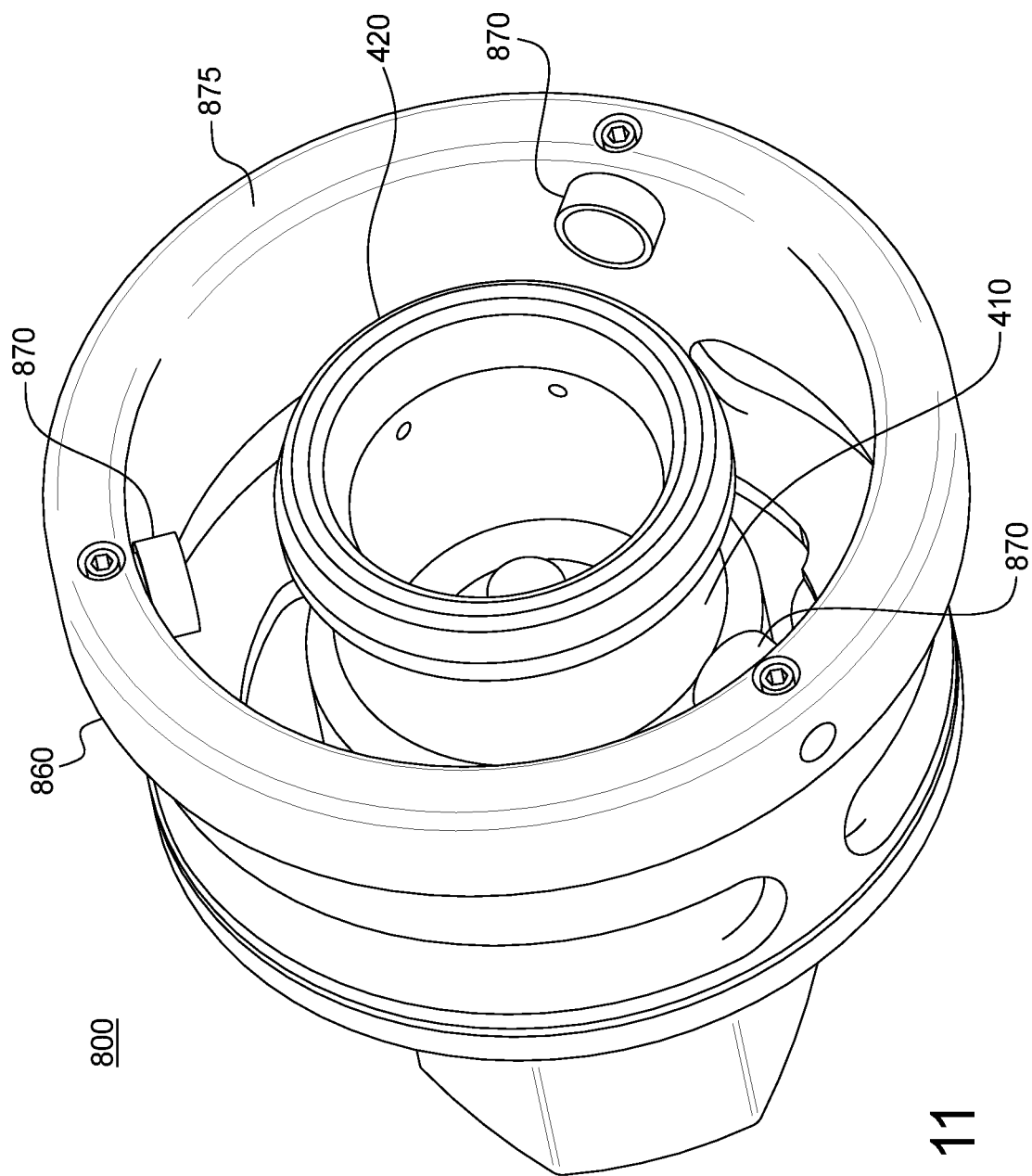
FIG. 11 is a perspective view of an exemplary fueling receptacle with anti-rotation adapter.
Figure 12:
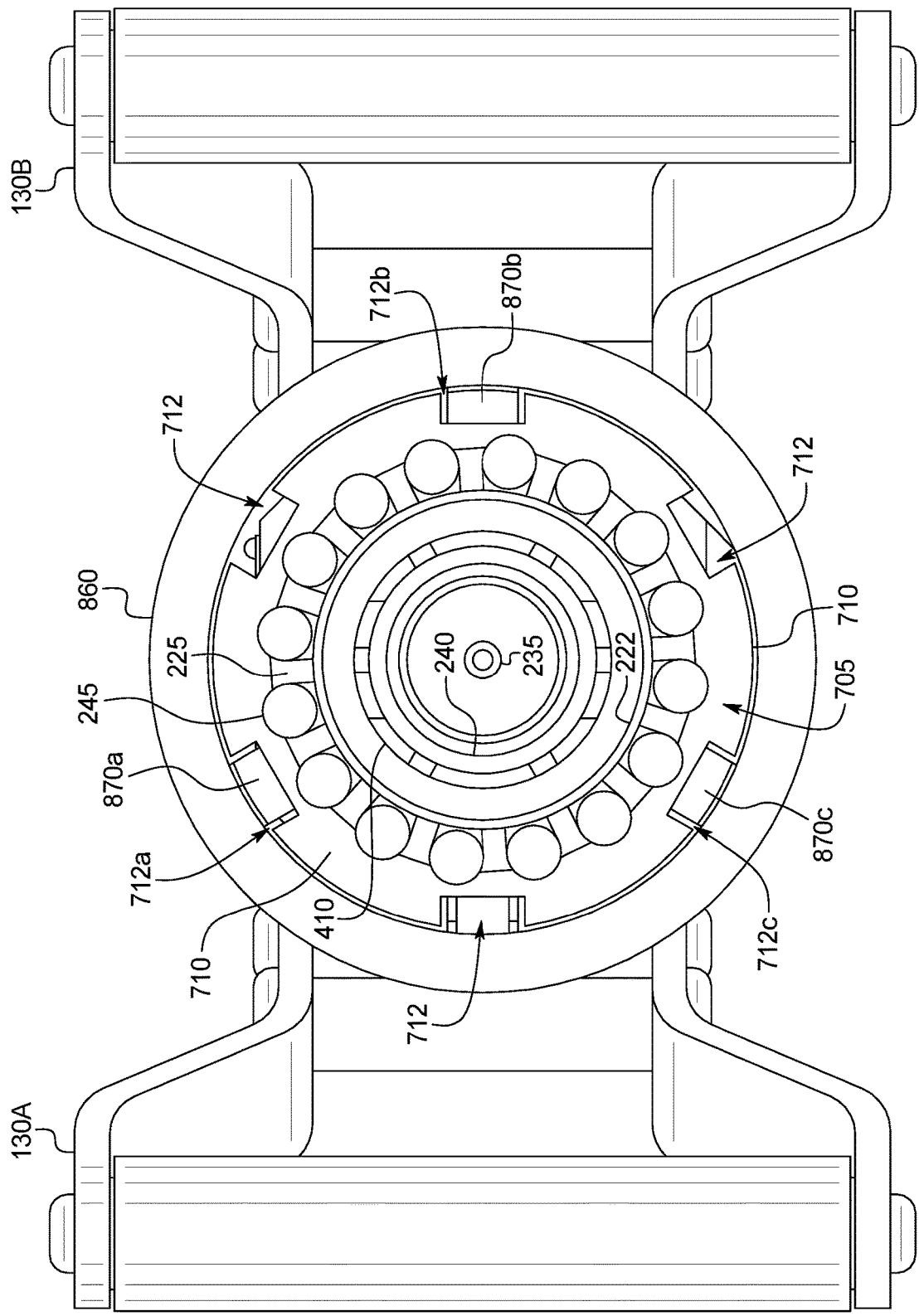
FIG. 12 is an end view of the coupler of FIG. 10 coupled to a portion of the receptacle of FIG. 11.

Likewise, receptacle 800 may be substantially similar to receptacle 400 shown in FIG. 4 and described herein, in structure and operation, except for the addition of anti-rotation adapter 860. For example, receptacle 800 includes coupling body 410 with lip 420 and recess 425, same as receptacle 400. As shown in FIG. 11, anti-rotation adapter 860 is attached to coupling body 410 and extends annularly and concentrically around lip 420. Adapter 860 extends past lip 420 and includes one or more bearings 870 adjacent to an outer lip 875 of the adapter 860. In embodiments, collar 710 defines channels 712 configured to engage bearings 870 and secure adapter 860 to sleeve 705 when coupler 700 is coupled to receptacle 800, as shown in FIG. 12. As shown in FIG. 10, the channels 712 are positioned radially around an outer surface of the collar 710. The channels 712 extend axially along the outer surface of the collar 710 to prevent rotation of the collar 710 and, thus, the coupler 700 relative to the receptacle 800 when the bearings 870 of the receptacle 800 are received by the channels 712 of the collar 710.

Figure 13:
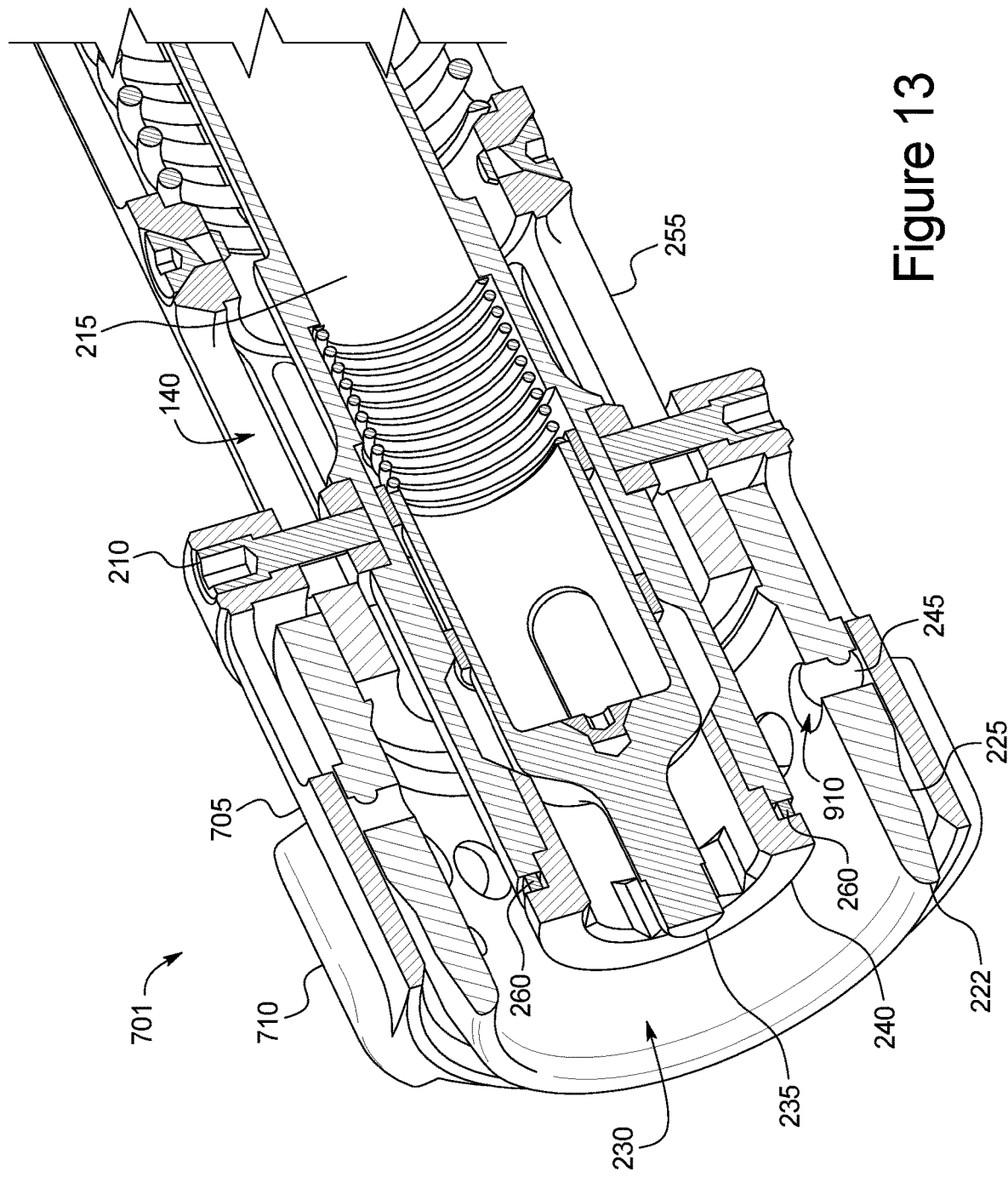
FIG. 13 is a cross-sectional view of a coupler head section of the coupler shown in FIG. 10.
Figure 14:
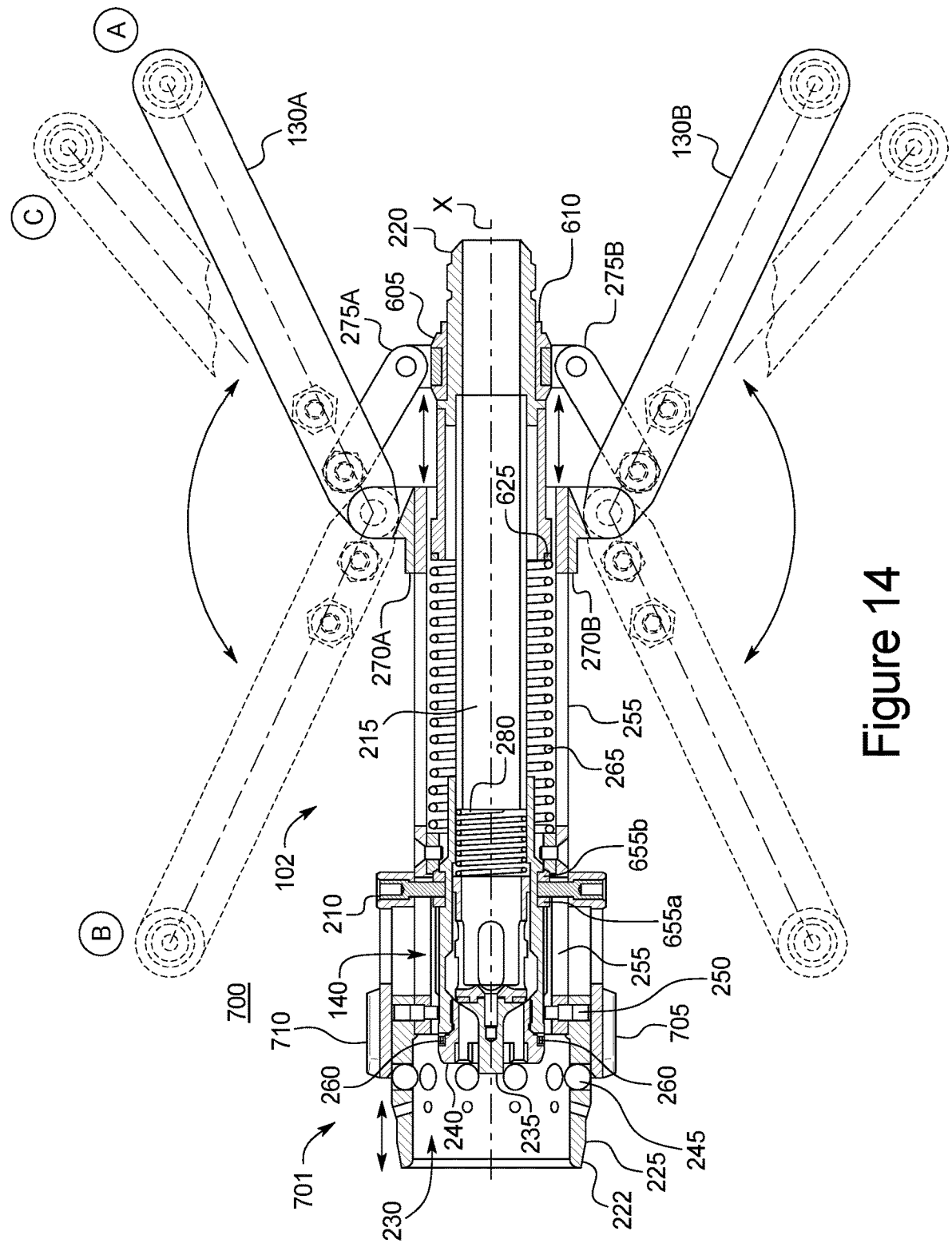
FIG. 14 is a side cross-sectional view of the coupler of FIG. 10 with handles in a decoupled position.
Figure 15:
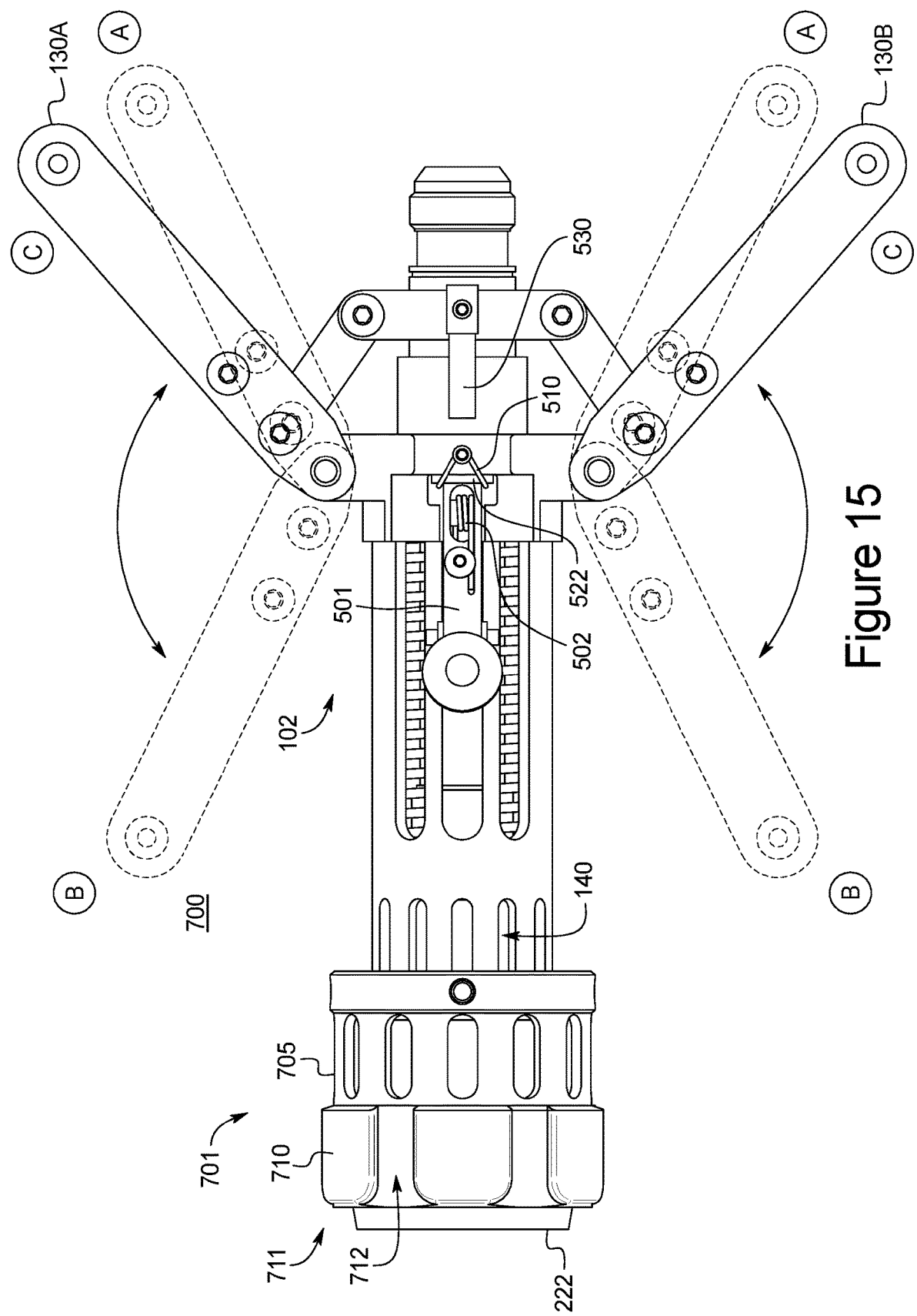
FIG. 15 is a top view of the coupler of FIG. 10 with handles in a venting position.

FIG. 13 is a cross-sectional view of coupler head section 701 with sleeve 705 coupled around or adjacent to ball cage 225. Like sleeve 205, anti-rotation sleeve 705 is linked to probe assembly 215 through drive pins 210 and longitudinally translates with probe assembly 215 by virtue of these drive pins 210. For example, in FIG. 14, which shows coupler 700 in a decoupled state (i.e. configuration A), sleeve 705 is longitudinally retracted with respect to ball cage 225. In FIG. 13, which shows coupler 700 in a coupled state (i.e. configuration B), sleeve 705 is longitudinally extended with respect to ball cage 225, so that the sleeve 705 covers balls 245 and ball slots 910. In FIG. 15, which shows coupler 700 in a venting state (i.e. configuration C), sleeve 705 is still longitudinally extended towards front end 222 since coupler 700 is still coupled to receptacle 800 in this position.

Figure 16:
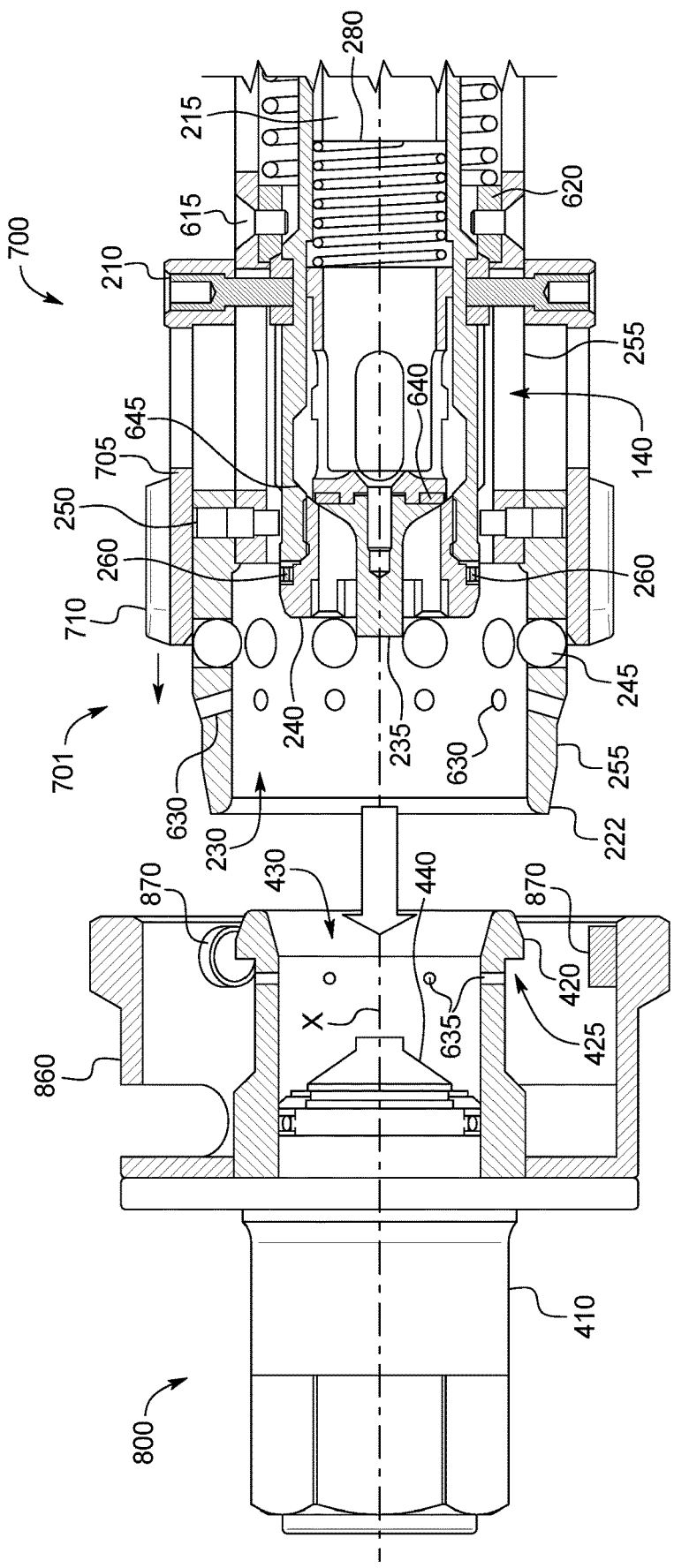
FIG. 16 is a side cross-sectional view of the coupler of FIG. 10 and the receptacle of FIG. 11.

FIG. 16 is a side cross-sectional view of rapid-connect coupler 700 and fueling receptacle 800 aligned along a central axis X. Coupler 700 is configured to couple with fueling receptacle 800 by sliding first coupling orifice 230 into coupling body 410 and around an outside of lip 420, which enables retainer 240 to slide into second poppet orifice 430. When coupling body 410 is initially received within first coupling orifice 230, lip 420 pushes the one or more balls 245 radially outward in their respective ball slots 910 until lip 420 longitudinally translates past balls 245. As sleeve 705 longitudinally translates forward, towards receptacle 800, sleeve 705 presses balls 245 back into slots 910. Once coupler 700 is fully coupled to receptacle 800 (i.e. configuration B), sleeve 705 covers ball slots 910, which locks balls 245 into recess 425 behind lip 420 of the coupling body 410. This locks the fueling receptacle 800 to the coupler 700, and secures communication between first coupling orifice 230 and second poppet orifice 430.

As the coupler 700 is initially inserted into the receptacle 800, i.e. prior to engaging configuration B, the user must position collar 710 relative to adapter 860 so that each bearing 870 is aligned with one of the channels 712. This enables collar 710 to slide or translate into adapter 860 as sleeve 705 longitudinally translates over balls 245 and towards receptacle 800, just before reaching configuration B. It should be appreciated that failing to align bearings 870 with channels 712 will prevent sleeve 705 from moving forwards, thus preventing coupler 700 from being coupled to receptacle 800. On the other hand, when collar 710 and adapter 860 are properly aligned, attachment of coupler 700 to receptacle 800 will continue to completion as described herein with respect to FIGS. 1-9.

FIG. 12 is a cross-sectional view of coupler 700 attached to receptacle 800. In the illustrated embodiment, adapter 860 includes three bearings 870a, 870b, 870c placed substantially equidistant from each other along an inner circumference of the adapter 860, adjacent to the outer lip 875. The illustrated collar 710 includes six channels 712 placed radially around an outer surface of the collar 710, so that they are substantially equidistant from each other along an outer circumference of the collar 710. While FIG. 12 shows bearings 870a, 870b, and 870c coupled to channels 712a, 712b, and 712c, respectively, it should be appreciated that the bearings 870 may be coupled to other combinations of channels 712 by rotating the coupler 700 until the other channels 712 are appropriately aligned with the bearings 870. Other embodiments may have different combinations and/or arrangements for bearings 870 and channels 712, such as, for example, only three channels 712, as many as six bearings 870, and others.

As shown, the channels 712 may be recesses or notches formed into an outer surface of the collar 710. In some cases, each channel 712 may be configured (e.g., sized and shaped) to receive any one of the bearings 870. For example, a height and width of each channel 712 may be selected to enable any of the bearings 870 to slide easily into the channel 712. In addition, a length of each channel 712 may be selected to prevent the bearings 870 from sliding off of a back end of the collar 710 as sleeve 705 translates forward during coupling to the receptacle 800. In some embodiments, collar 710 may include a back wall that prevents the bearings 870 from sliding out of the channels 712 or past the collar 710. In some cases, each channel 712 may be configured (e.g., sized and shaped) to form a tight or close fit around any one of the bearings 870. For example, each channel 712 may be formed by two walls that are spaced apart so that little or no gap remains between the channel walls and the bearing 870 coupled therein. This snug fit may be preferred to prevent rattling or shaking of the coupler 700 as it tries to rotate away from the receptacle 800.

As shown, bearings 870 may be circular discs positioned on an inner surface of the adapter 860, just inside outer lip 875. Each bearing 870 has a flat, round top and a height that protrudes substantially perpendicularly from the inner surface of the adapter 860, or towards an opposing side of the inner surface. The circular shape and height of the bearings 870 may be selected to facilitate insertion of bearings 870 into selected channels 712 and sliding of bearings 870 through those channels 712. In some cases, each bearing 870 may be configured (e.g., sized and shaped) to fit snugly within any one of the channels 712.

An example coupler disclosed herein for connecting a tank to a receptacle includes a housing, a probe configured to translate in a longitudinal direction within the housing, and a handle assembly configured to cause the probe to translate within the housing. The handle assembly is movable between a first position corresponding to a decoupled position where the tank is disconnected from the receptacle, a second position corresponding to a coupled position where the tank is connected to the receptacle, and a third position corresponding to a venting position where the tank is connected to the receptacle and venting of fluid is enabled. The example coupler also includes a slidable sleeve coupled to an outer surface of the probe and configured to translate with the probe in the longitudinal direction. The sleeve includes a collar configured to engage the receptacle in the coupled position and the venting position in a manner such that the collar is prevented from rotating relative to the receptacle in both the coupled position and the venting position.

In some examples, the collar is configured to engage an adapter attached to the receptacle. The collar includes a plurality of channels positioned radially around the collar for engaging the adapter, and each channel is configured to receive any one of a plurality of bearings included on the adapter. In some such examples, the plurality of channels extend axially along an outer surface of the collar to prevent the collar from rotating relative to the receptacle in both the coupled position and the venting position. In some such examples, each channel is configured to prevent a bearing coupled thereto from sliding out from a back end of the channel. Further, in some such examples, each channel is formed by two walls configured to form a close fit around a bearing coupled thereto.

Some such examples include a stop assembly configured to selectively arrest the translation of the probe in a first translation direction when the handle assembly is moved from the second position to the third position. Further, in some such examples, the stop assembly is configured to arrest the translation of the probe by providing a hard stop for the probe in the first translation direction. Moreover, in some such examples, the stop assembly is configured to enable translation of the probe in a second probe translation direction, opposite the first translation direction, when the hard stop is provided. Further, in some such examples, the stop assembly includes a pawl configured to occupy both an active position and an inactive position. The active position arrests the translation of the probe. Moreover, in some such examples, the stop assembly comprises a catch fixed to the housing and configured to hold the pawl in the inactive position, a lever configured to engage the pawl, and a spring fixed to both the housing and the lever and configured to bias the pawl to the active position via the lever. Additionally, in some such examples, the stop assembly comprises a cam configured to disengage the pawl from the catch and cause the pawl to occupy the active position.

Some examples further include a plurality of radially translatable retaining objects configured to bind the coupler to the receptacle. In some such examples, the slidable sleeve is configured to cause radial translation of the retaining objects. Some such examples include a ball cage. The plurality of radially translatable retaining objects include a plurality of balls disposed in the ball cage.

In some examples, the handle assembly includes one or more handles rotatably coupled to the housing and operatively coupled to the probe. Some examples include a poppet and a valve seat located inside of the probe. The poppet is configured to translate with respect to the probe.

Another example coupler disclosed herein for connecting a tank to a receptacle includes a housing, a probe configured to translate in a longitudinal direction within the housing, and a handle operatively coupled to the probe to translate the probe within the housing. The handle is movable between a decoupled position that corresponds with the tank being disconnected from the receptacle, a coupled position that corresponds with the tank being connected to the receptacle, and a venting position that corresponds with fluid being enabled to vent when the tank is connected to the receptacle. The example coupler also includes a slidable sleeve coupled to and configured to translate with the probe. The sleeve includes a collar configured to engage and prevent rotation relative to the receptacle in the coupled position and the venting position.

In some examples, an outer surface of the collar defines channels that are positioned radially around the collar. Each of the channels is configured to receive a bearing of a receptacle adapter to couple the collar to the receptacle. The channels extend axially along the outer surface of the collar to prevent rotation of the collar relative to the receptacle when coupled together. In some such examples, the channels that extend axially along the outer surface of the collar are equidistantly spaced apart from each along the outer surface of the collar. In some such examples, the collar includes a back wall adjacent the channels to prevent bearings of the receptacle adapter from sliding through and beyond the channels.

An example rapid-connect coupler disclosed herein for connecting a tank to a receptacle includes a housing body, a probe configured to translate within the housing body, a plurality of retaining objects, and a slidable sleeve configured to longitudinally translate with the probe and cause radial translation of the plurality of retaining objects with respect to the housing body. The slidable sleeve includes a collar configured to engage an adapter coupled to the receptacle for preventing rotation of the coupler relative to the receptacle. The example rapid-connect coupler also includes a poppet and a valve seat located inside of the probe. The poppet is configured to translate with respect to the probe. The example rapid-connect coupler also includes a handle assembly configured to cause the probe to translate within the housing body and a stop assembly configured to selectively arrest the translation of the probe. The stop assembly includes a pawl configured to occupy both an active position and an inactive position. The active position arrests the translation of the probe. The stop assembly also includes a catch fixed to the housing body and configured to hold the pawl in the inactive position, a lever configured to engage the pawl, a spring fixed to both the housing body and the lever and configured to bias the pawl to the active position via the lever, and a cam configured to disengage the pawl from the catch and cause the pawl to occupy the active position.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A coupler for connecting a tank to a receptacle including an adapter having a plurality of bearings, the coupler comprising:
  a housing;
  a probe configured to translate in a longitudinal direction within the housing;

a handle assembly configured to cause the probe to translate within the housing, wherein the handle assembly is movable between a first position corresponding to a decoupled position where the tank is capable of being disconnected from the receptacle, a second position corresponding to a coupled position where the tank is capable of being connected to the receptacle, and a third position corresponding to a venting position where the tank is capable of being connected to the receptacle and venting of fluid is enabled; and a slidable sleeve coupled to an outer surface of the probe and configured to translate with the probe in the longitudinal direction, the sleeve including a collar configured to engage the receptacle in the coupled position and the venting position in a manner such that the collar is prevented from rotating relative to the receptacle in both the coupled position and the venting position;

wherein the collar comprises a plurality of channels positioned radially around the collar for engaging the adapter, and each channel being configured to receive any one of the plurality of bearings included on the adapter.

2. The coupler of claim 1, wherein the plurality of channels extend axially along an outer surface of the collar to prevent the collar from rotating relative to the receptacle in both the coupled position and the venting position.

3. The coupler of claim 1, wherein each channel is configured to prevent one of the plurality of bearings coupled thereto from sliding out from a back end of the channel.

4. The coupler of claim 1, wherein each channel is formed by two walls configured to form a close fit around one of the plurality of bearings coupled thereto.

5. The coupler of claim 1, further comprising a stop assembly configured to selectively arrest the translation of the probe in a first translation direction when the handle assembly is moved from the second position to the third position.

6. The coupler of claim 5, wherein the stop assembly is configured to arrest the translation of the probe by providing a hard stop for the probe in the first translation direction.

7. The coupler of claim 6, wherein the stop assembly is configured to enable translation of the probe in a second probe translation direction, opposite the first translation direction, when the hard stop is provided.

8. The coupler of claim 5, wherein the stop assembly comprises a pawl configured to occupy both an active position and an inactive position, wherein the active position arrests the translation of the probe.

9. The coupler of claim 8, wherein the stop assembly comprises a catch fixed to the housing and configured to hold the pawl in the inactive position, a lever configured to engage the pawl, and a spring fixed to both the housing and the lever and configured to bias the pawl to the active position via the lever.

10. The coupler of claim 9, wherein the stop assembly comprises a cam configured to disengage the pawl from the catch and cause the pawl to occupy the active position.

11. The coupler of claim 1, wherein the handle assembly includes one or more handles rotatably coupled to the housing and operatively coupled to the probe.

12. The coupler of claim 1, further comprising a poppet and a valve seat located inside of the probe, the poppet configured to translate with respect to the probe.

13. A coupler for connecting a tank to a receptacle, comprising:

a housing;

a probe configured to translate in a longitudinal direction within the housing;

a handle assembly configured to cause the probe to translate within the housing, wherein the handle assembly is movable between a first position corresponding to a decoupled position where the tank is capable of being disconnected from the receptacle, a second position corresponding to a coupled position where the tank is capable of being connected to the receptacle, and a third position corresponding to a venting position where the tank is capable of being connected to the receptacle and venting of fluid is enabled; and a slidable sleeve coupled to an outer surface of the probe and configured to translate with the probe in the longitudinal direction, the sleeve including a collar configured to engage the receptacle in the coupled position and the venting position in a manner such that the collar is prevented from rotating relative to the receptacle in both the coupled position and the venting position; and a plurality of radially translatable retaining objects configured to bind the coupler to the receptacle.

14. The coupler of claim 13, wherein the slidable sleeve is configured to cause radial translation of the retaining objects.

15. The coupler of claim 14, further comprising a ball cage, wherein the plurality of radially translatable retaining objects include a plurality of balls disposed in the ball cage.

16. A coupler for connecting a tank to a receptacle having a plurality of bearings, the coupler comprising:

a housing;

a probe configured to translate in a longitudinal direction within the housing;

a handle operatively coupled to the probe to translate the probe within the housing, wherein the handle is movable between a decoupled position that corresponds with the tank being disconnected from the receptacle, a coupled position that corresponds with the tank being connected to the receptacle, and a venting position that corresponds with fluid being enabled to vent when the tank is connected to the receptacle; and a slidable sleeve coupled to and configured to translate with the probe, wherein the sleeve includes a collar configured to engage and prevent rotation relative to the receptacle in the coupled position and the venting position;

wherein an outer surface of the collar defines channels that are positioned radially around the collar, wherein each of the channels is configured to receive one of the plurality of bearings to couple the collar to the receptacle, and wherein the channels extend axially along the outer surface of the collar to prevent rotation of the collar relative to the receptacle when coupled together.

17. The coupler of claim 16, wherein the channels that extend axially along the outer surface of the collar are equidistantly spaced apart from each along the outer surface of the collar.

18. The coupler of claim 16, wherein the collar includes a back wall adjacent the channels to prevent the plurality of bearings from sliding through and beyond the channels.

* * * * *